United States Patent [19]
Tominaga et al.

[11] Patent Number: 5,819,904
[45] Date of Patent: Oct. 13, 1998

[54] WORKPIECE CONVEYING SYSTEM

[75] Inventors: Kanji Tominaga; Toshio Ando, both of Mie, Japan

[73] Assignee: Honda Giken Kogyo Kabushiki Kaisha, Tokyo, Japan

[21] Appl. No.: 559,237

[22] Filed: Nov. 17, 1995

[30] Foreign Application Priority Data

Apr. 20, 1995 [JP] Japan .................................. 7-094698

[51] Int. Cl.$^6$ .................................................. B65G 47/00
[52] U.S. Cl. .................... 198/346; 198/346.1; 198/346.2
[58] Field of Search ............... 198/346, 346.2, 198/346.3, 781.08, 465.1, 803.01

[56] References Cited

U.S. PATENT DOCUMENTS

| | | | |
|---|---|---|---|
| 1,691,881 | 11/1928 | Fuller ...................................... | 198/346 |
| 1,897,901 | 2/1933 | Hagopian ................................ | 198/346 |
| 4,306,646 | 12/1981 | Magni ............................... | 198/346.2 X |
| 4,609,137 | 9/1986 | De Filipps ........................ | 198/346.2 X |
| 4,722,653 | 2/1988 | Williams et al. ................. | 198/346.1 X |
| 5,322,154 | 6/1994 | Lenherr ................................. | 198/460 |

FOREIGN PATENT DOCUMENTS

| | | |
|---|---|---|
| 747317 | 4/1956 | United Kingdom . |
| 1444126 | 7/1976 | United Kingdom . |
| 1593080 | 7/1981 | United Kingdom . |
| 2228910 | 9/1990 | United Kingdom . |

*Primary Examiner*—James R. Bidwell
*Attorney, Agent, or Firm*—Merchant, Gould, Smith, Edell, Welter & Schmidt

[57] ABSTRACT

A production line has a plurality of processing stations which includes both manual and automatic processing stations. A workpiece conveying system combined with the production line has a base, a pair of side plates mounted on the base, a plurality of spaced roller shafts rotatably supported on the side plates, a plurality of rollers mounted on the roller shafts for conveying workpieces thereon, and a drive mechanism for rotating the roller shafts to rotate the rollers. In the manual processing station, the rollers are rigidly fixed to the roller shafts for conveying workpieces at fixed intervals. In the automatic processing station, the rollers are held in frictionally rotatable engagement with the roller shafts for rotation in unison with the roller shafts. When resistive forces greater than a given level are applied to the rollers, the roller shafts rotate idly thereby adjusting intervals between workpieces in the automatic processing station.

8 Claims, 4 Drawing Sheets

WORKPIECE CONVEYING SYSTEM

BACKGROUND OF THE INVENTION

1. Field of the Invention

The present invention relates to a workpiece conveying system for use with a production line having a plurality of processing stations which includes both manual and automatic processing stations.

2. Description of the Related Art

Workpiece conveying systems such as slat conveyors, free-flow conveyors, etc. are incorporated in some production lines such as automobile assembly lines, for example. The slat conveyor which conveys workpieces at fixed pitches or intervals allows working personnel to be organized easily along the production line and facilitates processing management. However, the slat conveyor presents obstacles to efforts to automatize production processes because it poses problems with respect to the accuracy of positioning of workpieces. For automatizing a portion of a production lane, it often is effective to employ a free-flow conveyor which is capable of adjusting intervals or pitches at which workpieces are conveyed along the production line.

FIG. 4 of the accompanying drawings shows a conventional free-flow conveyor. As shown in FIG. 4, the free-flow conveyor comprises a drive shaft 51, a plurality of spaced bevel gears 52 mounted on the drive shaft 51, a plurality of spaced roller shafts 53, and a plurality of pairs of bevel gears 54 mounted on respective ends of the roller shafts 53 and held in mesh with the bevel gears 52, respectively. As shown in FIG. 5 of the accompanying drawings, each of the roller shafts 53 supports a pair of axially spaced rollers 57 frictionally slidably mounted on respective bushings 55 which are fixed to the roller shaft 53 near its opposite ends by respective keys 56.

A workpiece (not shown) is conveyed on a pallet P which is placed on and transferred successively by the rollers 57. When the drive shaft 51 is rotated about its own axis, the bevel gears 52 are rotated to cause the bevel gears 54 to rotate the roller shafts 53. Unless the workpiece or the pallet P is subject to resistive forces, the bushings 55 and the rollers 57 are rotated in unison with each other under frictional forces by the rollers shaft 53, so that the workpiece is fed down the free-flow conveyor. If the workpiece or the pallet P is subjected to resistive forces greater than a certain level and tending to stop the workpiece, the bushings 55 slip against the rollers 57, causing the roller shafts 53 to rotate idly.

Therefore, even when resistive forces are applied to a certain pallet P that is being conveyed, only that pallet P is stopped, and other pallets P that are also being conveyed are allowed to move continuously along the free-flow conveyor. The free-flow conveyor with such a selective pallet positioning capability makes it easy to position certain workpieces with increased accuracy. However, the free-flow conveyor is disadvantageous in that its feed speed is selected to match the operating cycle of automatic processing machines that are combined with the free-flow conveyor to process workpieces that are conveyed by the free-flow conveyor. Therefore, if the free-flow conveyor is associated with a production line having a plurality of processing stations which includes both manual and automatic processing stations, then the free-flow conveyor is liable to operate out of synchronism with the operating cycle of the manual processing stations.

One solution to the above problem is shown in FIG. 6 of the accompanying drawings. In FIG. 6, workers Q are placed successively in manual processing stations along a production line, and a processing machine R is positioned between two of the workers Q. According to the illustrated solution, empty pallets P0 which are free of workpieces are inserted between some pallets P which carry workpieces, or the number of workers Q in manual processing stations is increased to adjust the manual processing stations to operate in timed relation to the feed speed of the free-flow conveyor and hence the operating cycle of the processing machine R.

The insertion of empty pallets P0 requires a complex procedure to be carried out for the management of the pallets P, P0 used on the free-flow conveyor, and results in a poor production efficiency because the worker in front of any empty pallet P0 usually waits idly for a certain period of time. The production efficiency is also poor if number of workers Q in manual processing stations is increased.

SUMMARY OF THE INVENTION

It is therefore an object of the present invention to provide a workpiece conveying system which is used with a production line for adjusting different operating cycles of manual and automatic processing stations of the production line without lowering the operation efficiency thereof.

According to the present invention, there is provided a workpiece conveying system for use with a production line having a manual processing station and an automatic processing station, comprising a first section for conveying workpieces at fixed intervals in the manual processing station, and a second section coupled to the first section, for conveying workpieces at variable intervals in the automatic processing station.

According to the present invention, there is also provided a workpiece conveying system comprising a first section combined with a first production line processing station operable in a first cycle, for conveying workpieces at fixed intervals, and a second section coupled to the first section and combined with a second production line processing station operable in a second cycle different from the first cycle, for conveying workpieces at variable intervals. The first production line processing station may comprise a manual processing station for manually processing the workpieces conveyed by the first section, and the second production line processing station may comprise an automatic processing station for automatically processing the workpieces conveyed by the second section.

Each of the first section and the second section may comprises a base, a pair of side plates mounted on the base, a plurality of spaced roller shafts rotatably supported on the side plates, a plurality of rollers mounted on the spaced roller shafts for conveying workpieces thereon, and a drive mechanism for rotating the spaced roller shafts to rotate the rollers, the first section further comprising fixing means for fixing the rollers to the spaced roller shafts in the first section, the second section further comprising frictional engaging means for keeping the rollers in frictionally rotatable engagement with the spaced roller shafts in the second section, whereby the spaced roller shafts will rotate idly when resistive forces greater than a predetermined level are applied to the rollers.

The drive mechanism in each of the first section and the second section may comprise a drive motor and a plurality of gear assemblies connected to the drive motor and the spaced roller shafts, respectively. The drive motors of the drive mechanisms in the first section and the second section may be independent of each other. The drive motor of the drive mechanism in the first section may produce drive forces variable depending on resistive forces applied to the rollers.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
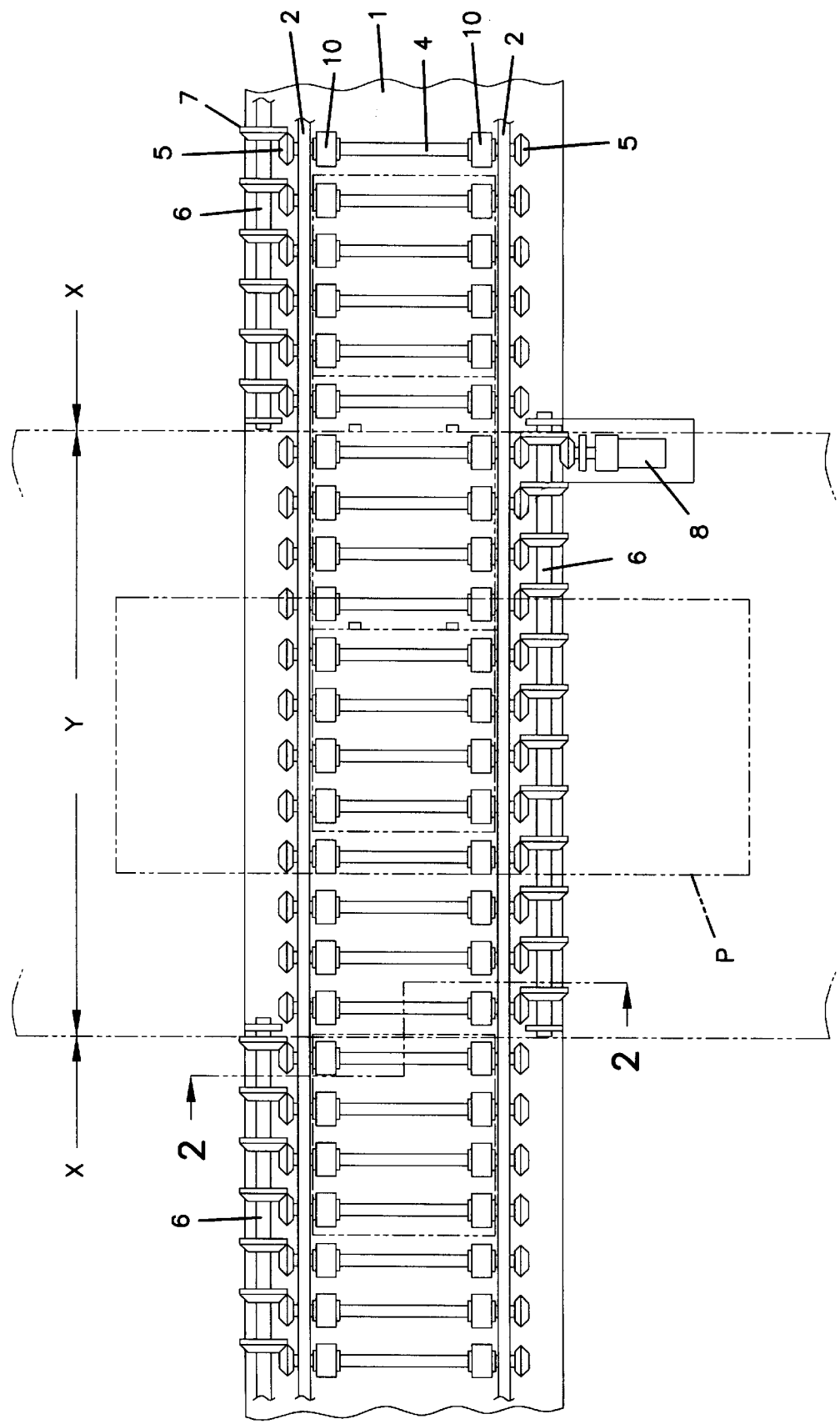
FIG. 1 is a fragmentary plan view of a workpiece conveying system according to the present invention.
Figure 3:
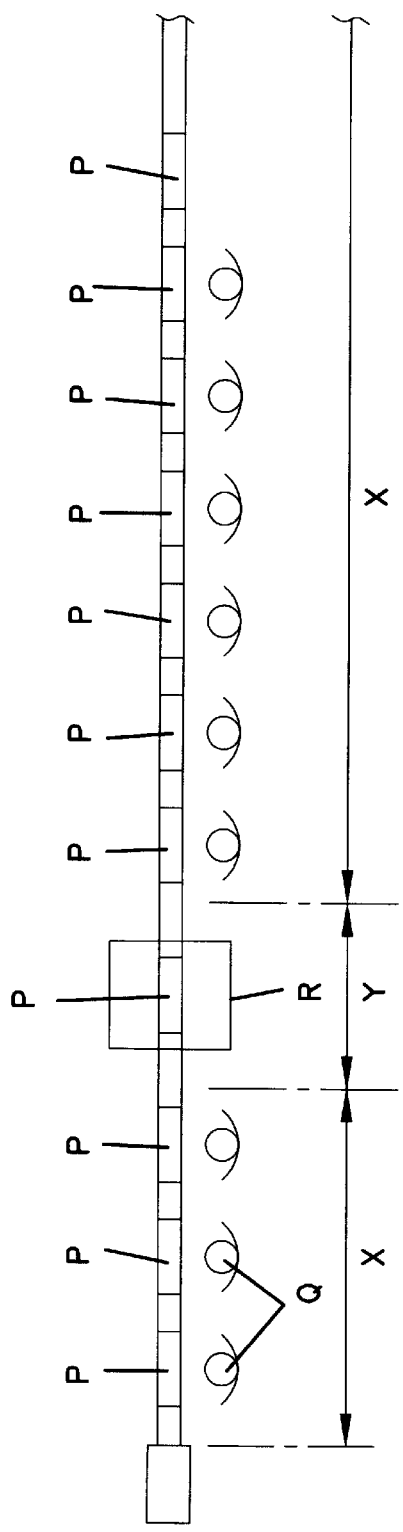
FIG. 3 is a schematic fragmentary plan view of the workpiece conveying system shown in FIG. 1.
Figure 6:
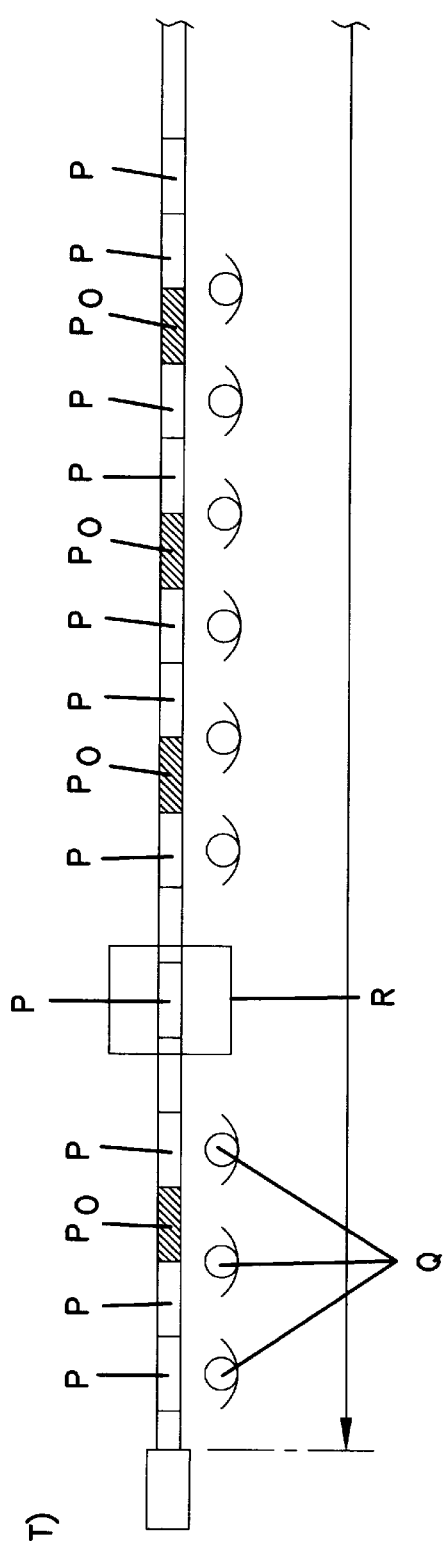
FIG. 6 is a schematic fragmentary plan view of the conventional workpiece conveying system shown in FIG. 4.
Figure 4:
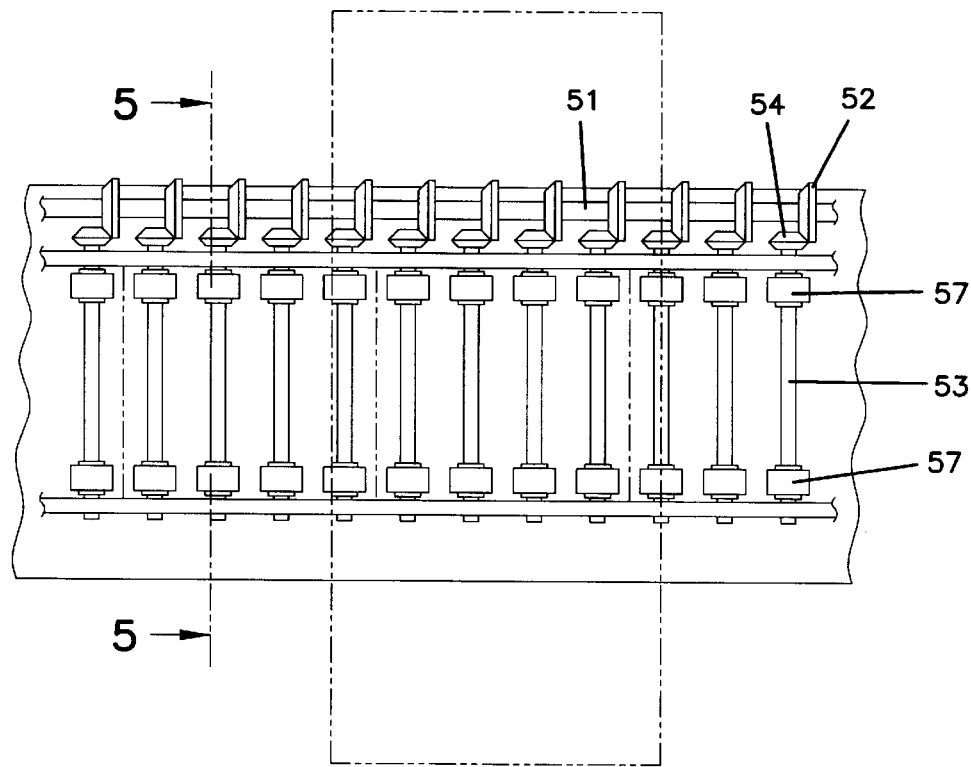
FIG. 4 is a fragmentary plan view of a conventional workpiece conveying system.
Figure 5:
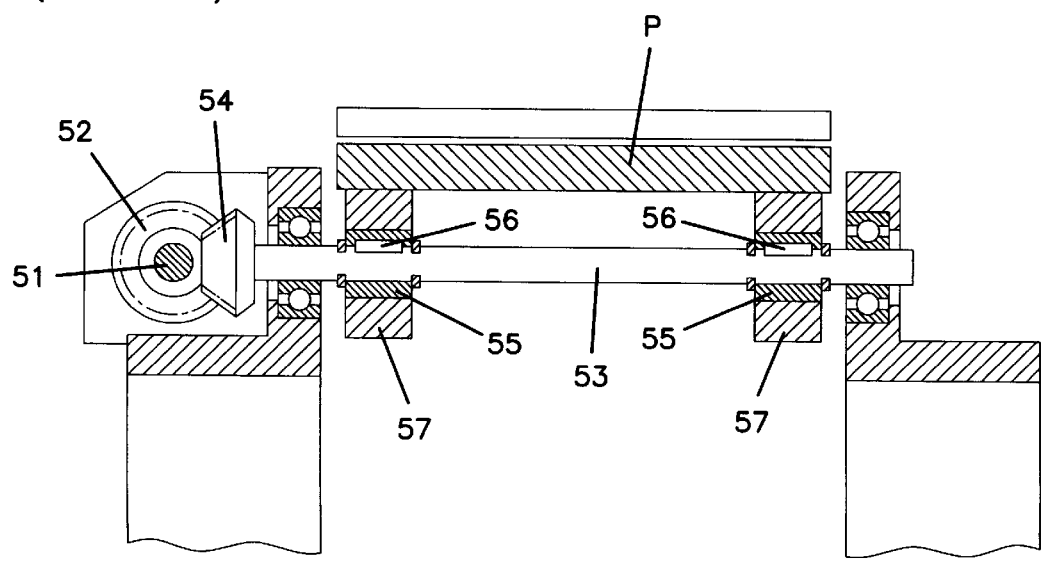
FIG. 5 is a cross-sectional view taken along line V—V of FIG. 4.

As shown in FIG. 1, a workpiece conveying system according to the present invention incorporates a free-flow conveyor combined with a production line such as an automobile assembly line, for examples The production line has a plurality of processing stations which includes both manual and automatic processing stations. The manual processing stations are attended by respective workers Q (see FIG. 3) who manually process workpieces conveyed by the free-flow conveyor. The automatic processing station has an automatic processing machine R (see FIG. 3) which automatically processes a workpiece conveyed by the free-flow conveyor.

The manual processing stations are positioned in manual line sections X in which pallets P are conveyed at fixed pitches or intervals, and the automatic processing station is positioned in an automatic line section Y which is inserted between the manual line sections X and in which pallets P are conveyed at variable pitches or intervals.

As shown in FIG. 1, the free-flow conveyor has an elongate base 1 extending along the production line and a pair of transversely spaced side plates 2 projecting upwardly from the base 1. The free-flow conveyor also has a plurality of roller shafts 4 spaced longitudinally there-along and each rotatably supported on the side plates 2 by bearings 3 (see FIG. 2) near opposite ends of the roller shaft 4. Bevel gears 5 are mounted respectively on the opposite posite ends of each of the roller shafts 4 outside of the side plates 2. In each of the manual line sections X and the automatic line section Y, one of the bevel gears 5 on each of the roller shafts 4 is held in mesh with one of axially spaced bevel gears 7 that are mounted on a drive shaft 6.

The drive shafts 6 in the manual line sections X are separate and positioned remotely from the drive shaft 6 in the automatic line section Y across the roller shafts 4. The drive shaft 6 in the automatic line section Y can be rotated by a drive motor 8 positioned in the automatic line section Y. The drive shafts 6 in the manual line sections X can be rotated by drive motors (not shown) positioned in the manual line sections X. The drive shafts 6 in the manual line sections X and the drive shaft 6 in the automatic line section Y may be located on the same side of the roller shafts 4 if a space is available for such an installation The illustrated layout is, however, convenient for an addition of the automatic line section Y because the drive shaft 6 in the existing automatic line section Y may simply be extended for connection to an additional automatic line section Y.

Figure 2:
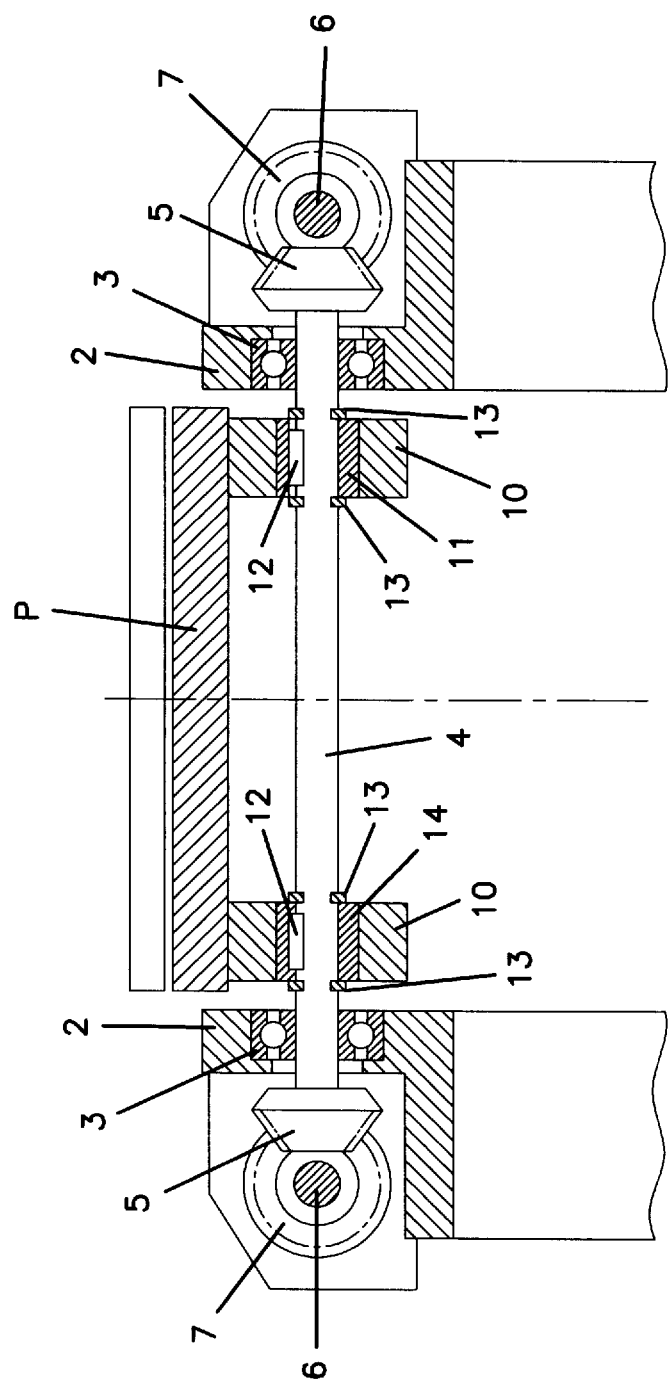
FIG. 2 is a cross-sectional view taken along line II—II of FIG. 1.

As shown in FIG. 2, each of the roller shafts 4 support a pair of axially spaced rollers 10. The rollers 10 in the automatic line section Y are mounted on the roller shafts 4 in a free-flow configuration illustrated in the right-hand halt of FIG. 2, and the rollers 10 in the manual line sections X are mounted on the roller shafts 4 by a rigid configuration illustrated in the left-hand half of FIG. 2.

According to the free-flow configuration, each of the rollers 10 is frictionally slidably fitted over a bushing 11 which is fixedly mounted on the roller shaft 4 by a key 12, and axially positioned by a pair of positioning rings 13 located axially one on each side of the bushing 11. Unless the pallet P on the roller 10 is subject to resistive forces, the bushing 11 and the roller 10 frictionally rotate in unison with each other. When resistive forces greater than a certain level are applied to a pallet P on the roller 10, the bushing 11 slips against the roller 10, allowing the roller shaft 4 to rotate idly.

According to the rigid configuration, a collar 14 is force-fitted in each of the rollers 10 and fixedly mounted on the roller shaft 4 by a key 12. Each of the rollers 10 is axially positioned by a pair of positioning rings 13 located axially one on each side of the collar 14. The drive motors (not shown) for rotating the drive shafts 6 in the manual line sections x produce relatively low drive forces such that when a pallet P on the roller 10 is manually resisted, the rotational speed of the roller 10 is lowered.

Operation of the workpiece conveying system according to the present invention will be described below.

In each of the manual line sections X, the pallets lets P for supporting workpieces thereon are conveyed at fixed pitches or intervals. In the automatic line section Y, the pallets P for supporting workpieces thereon are conveyed at variable pitches or intervals. Therefore, the workers Q can be organized easily in the manual line sections X, and workpieces can be positioned highly accurately in the automatic line section Y. Differences between the operating cycles of the manual line sections x and the automatic line section Y can be eliminated by adjusting the pallet intervals in the automatic line section Y without inserting empty pallets between some of the pallets. Such differences may also be eliminated by varying feed speeds in the manual line sections X and the automatic line section Y because the drive motors in the manual line sections X and the automatic line section Y are independent of each other.

Since no empty pallets are inserted, the workers Q are not required to wait idly for a certain period of time while the production line is in operation.

The workers Q in each of the manual line sections X may have to carry out different numbers of processing steps. In such a case, it is possible to lower the feed speed or stop the production line in the manual line sections X while maintaining fixed pallet intervals, so as to meet the efficiency of those workers Q who have the greatest number of processing steps.

The roller shafts 4 are associated with the respective sets of bevel gears 5, 7 rotatable by the drive shaft 6. Accordingly, drive forces are positively transmitted from the drive shaft to the individual roller shafts 4 for positioning workpieces on the pallets P highly accurately.

A manual line section X may be changed to an automatic line section Y or an automatic line section Y may be added simply by replacing collars 14 with bushings 11 or adding a drive shaft 6 and a drive motor 8.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A workpiece conveying system for use with a production line having a manual processing station and an automatic processing station, comprising:

a first section for conveying workpieces at fixed intervals in the manual processing station; and a second section coupled to said first section, for conveying workpieces at variable intervals in the automatic processing station;

each of said first section and said second section including;

a base;

a pair of side plates mounted on said base;

a plurality of spaced roller shafts rotatably supported on said side plates;

a plurality of rollers mounted on said spaced roller shafts for conveying workpieces thereon; and a drive mechanism for rotating said spaced roller shafts to rotate said rollers;

said first section further having means for fixing said rollers to said spaced roller shafts in the first section;

said second section having frictional engaging means for keeping said rollers in frictionally rotatable engagement with said spaced roller shafts in the second section, whereby said spaced roller shafts will rotate idly when resistive forces greater than a predetermined level are applied to said rollers.

2. A workpiece conveying system according to claim 1, wherein said drive mechanism in each of said first section and said second section comprises a drive motor and a plurality of gear assemblies connected to said drive motor and said spaced roller shafts, respectively.

3. A workpiece conveying system according to claim 2, wherein the drive motors of the drive mechanisms in said first section and said second section are independent of each other.

4. A workpiece conveying system according to claim 3, wherein the drive motor of the drive mechanism in said first section produces drive forces variable depending on resistive forces applied to the rollers.

5. A workpiece conveying system comprising:

a first section combined with a first production line processing station operable in a first cycle, for conveying workpieces at fixed intervals, said first production line processing station comprising a manual processing station for manually processing the workpieces conveyed by said first section; and a second section coupled to said first section and combined with a second production line processing station operable in a second cycle different from said first cycle, for conveying workpieces at variable intervals, said second production line processing station comprising an automatic processing station for automatically processing the workpieces conveyed by said second section;

each of said first section and said second section including;

a base;

a pair of side plates mounted on said base;

a plurality of spaced roller shafts rotatable supported on said side plates;

a plurality of rollers mounted on said spaced roller shafts for conveying workpieces thereon; and a drive mechanism for rotating said spaced roller shafts to rotate said rollers;

said first section having fixing means for fixing said rollers to said spaced roller shafts in the first section;

said second section having frictional engaging means for keeping said rollers in frictionally rotatable engagement with said spaced roller shafts in the second section, whereby said spaced roller shafts will rotate idly when resistive forces greater than a predetermined level are applied to said rollers.

6. A workpiece conveying system according to claim 5; wherein said drive mechanism in each of said first section and said second section comprises a drive motor and a plurality of gear assemblies connected to said drive motor and said spaced roller shafts, respectively.

7. A workpiece conveying system according to claim 6, wherein the drive motors of the drive mechanisms in said first section and said second section are independent of each other.

8. A workpiece conveying system according to claim 7, wherein the drive motor of the drive mechanism in said first section produces drive forces variable depending on resistive forces applied to the rollers.

* * * * *